(12) United States Patent
Zayic (10) Patent No.: US 8,121,882 B2
(45) Date of Patent: Feb. 21, 2012

(54) STANDARD PROCESS AND RESOURCE REFERENCE AND INSTANCE

(75) Inventor: Jerry D. Zayic, Renton, WA (US)

(73) Assignee: The Boeing Company, Chicago, IL (US)

( * ) Notice: Subject to any disclaimer, the term of this patent is extended or adjusted under 35 U.S.C. 154(b) by 1023 days.

(21) Appl. No.: 12/041,989

(22) Filed: Mar. 4, 2008

(65) Prior Publication Data

US 2009/0228310 A1 Sep. 10, 2009

(51) Int. Cl.
*G06F 17/60* (2006.01)

(52) U.S. Cl. ..................................... 705/7.26
(58) Field of Classification Search ............... 705/7.27
See application file for complete search history.

(56) References Cited

U.S. PATENT DOCUMENTS

| | | | |
|---|---|---|---|
| 5,576,946 A | 11/1996 | Bender et al. | |
| 5,812,394 A * | 9/1998 | Lewis et al. | 700/17 |
| 6,078,320 A * | 6/2000 | Dove et al. | 715/866 |
| 6,195,591 B1 * | 2/2001 | Nixon et al. | 700/83 |
| 6,266,726 B1 * | 7/2001 | Nixon et al. | 710/105 |
| 6,470,227 B1 * | 10/2002 | Rangachari et al. | 700/95 |
| 6,754,885 B1 * | 6/2004 | Dardinski et al. | 717/113 |
| 7,096,465 B1 * | 8/2006 | Dardinski et al. | 717/178 |
| 7,707,550 B2 * | 4/2010 | Resnick et al. | 717/121 |

* cited by examiner

*Primary Examiner* — Romain Jeanty
(74) *Attorney, Agent, or Firm* — Yee & Associates, P.C.

(57) ABSTRACT

A computer implemented method, apparatus, and computer program product for planning in a manufacturing process. In one embodiment, a library of standard manufacturing processes is created. The library comprises a plurality of master process objects. In response to generating a manufacturing project, a set of master process objects is selected from the plurality of master process objects in the library. The set of master process objects is associated with the manufacturing project to create a set of process usage objects within the manufacturing project. The set of master process objects in the library of standard manufacturing processes are linked to the manufacturing project without copying the set of master process objects into the manufacturing project. The set of usage process objects in the manufacturing project is populated with information specific to the manufacturing project.

17 Claims, 7 Drawing Sheets

STANDARD PROCESS AND RESOURCE REFERENCE AND INSTANCE

BACKGROUND INFORMATION

1. Field

The present disclosure is related generally to a data processing system, and in particular, to a method and apparatus for manufacturing processes. More particularly, the present disclosure is directed to a computer implemented method, apparatus, and computer usable program code for linking usage process objects with master process objects in standard manufacturing processes.

2. Background

Currently, when manufacturing process plans are created, much of the manufacturing process plan data is copied and stored multiple times. For example, when parts and resources are given a consumption in relation to a software process object, a unique copy of the process object is created and stored in a project library and database to account for these unique relationships. The copy of the process object in the project library holds all the information of the master process object definition and any local attribute modifications. This repeated copying and storing of the same data consumes system resources and may adversely affect data storage, system performance, and data management.

SUMMARY

An embodiment of the present disclosure provides a computer implemented method for planning in a manufacturing process. In one embodiment, a library of standard manufacturing processes is created. The library comprises a plurality of master process objects. In response to generating a manufacturing project, a set of master process objects is selected from the plurality of master process objects in the library. The set of master process objects is associated with the manufacturing project to create a set of process usage objects within the manufacturing project. The set of master process objects in the library of standard manufacturing processes are linked to the manufacturing project without copying the set of master process objects into the manufacturing project. The set of usage process objects in the manufacturing project is populated with information specific to the manufacturing project.

In another advantageous embodiment, a computer program product for planning in a manufacturing process is provided. The computer program product comprises a computer readable medium and program code stored on the computer readable medium that creates a library of standard manufacturing processes. The library comprises a plurality of master process objects. The program code stored on the computer readable medium selects a set of master process objects from the plurality of master process objects in the library in response to generating a manufacturing project. The program code stored on the computer readable medium associates the set of master process objects with the manufacturing project to create a set of process usage objects within the manufacturing project. The set of master process objects in the library of standard manufacturing processes are linked to the manufacturing project without copying the set of master process objects into the manufacturing project. The program code stored on the computer readable medium populates the set of usage process objects in the manufacturing project with information specific to the manufacturing project.

In yet another advantageous embodiment, an apparatus for production planning in a manufacturing process is provided. The apparatus includes a first database and a second database. The first database is configured as a library of standard manufacturing processes. The first database comprises a plurality of master process objects. Each master process object in the plurality of master process objects defines fixed attributes of processes. The second database is configured as a collection of manufacturing projects. Each manufacturing project comprises a set of usage process objects. Each usage process object corresponds to a master process object in the first database. Variable attributes associated with the manufacturing project are defined only in the set of usage process objects within the each manufacturing project.

Therefore, the advantageous embodiments provide master process objects linked to usage process objects in manufacturing processes to eliminate the use, management, and storage of multiple standard process software object copies in the project database. The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
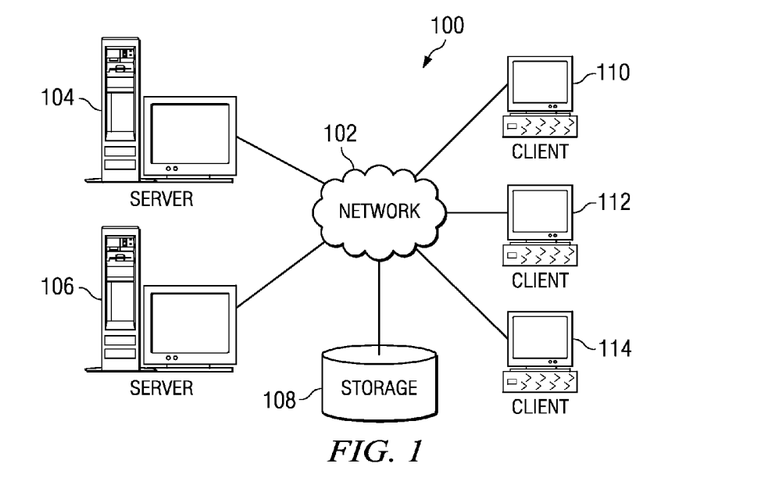
FIG. 1 is an illustration of a network of data processing systems in which advantageous embodiments may be implemented.
Figure 2:
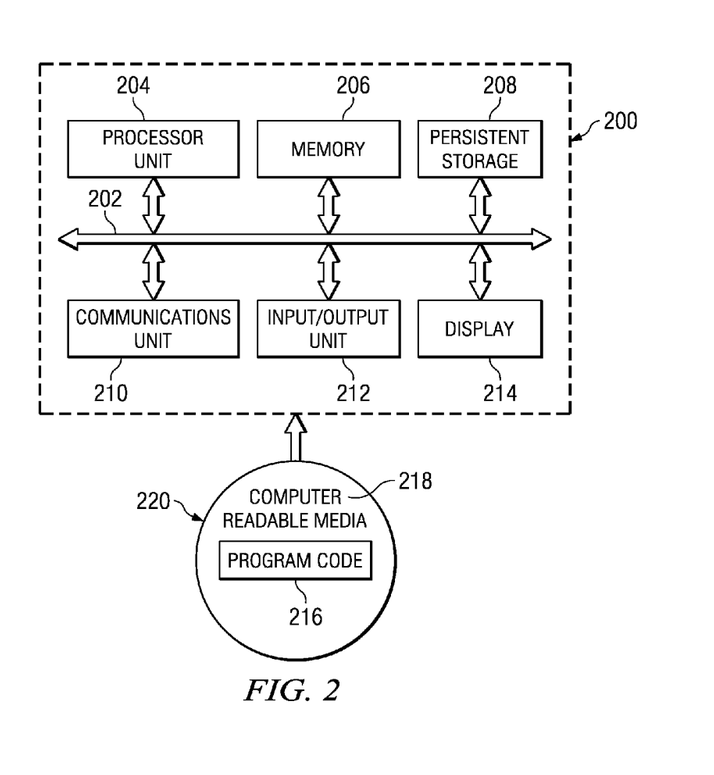
FIG. 2 is an illustration of a data processing system in accordance with an advantageous embodiment.

With reference now to the figures and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

The advantageous embodiments recognize that there is currently no solution or method to eliminate the use, management, and storage of multiple standard process software object copies in the project database, even if the information contained in the process object is identical to the master process object and definition.

Turning now to FIG. 2, a diagram of a data processing system is depicted in accordance with an illustrative embodiment of the present invention. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer readable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown.

As one example, a storage device in data processing system 200 is any hardware apparatus that may store data. Memory 206, persistent storage 208 and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Current project management systems use copies of standard manufacturing process master objects in each project instance. For each usage of a copy of the master, the master information is saved along with the information that is unique for each usage in the project instance. The embodiments recognize that this results in inefficient utilization of data processing system memory and resources.

Therefore, the advantageous embodiments provide a computer implemented method, apparatus, and computer program product for planning in a manufacturing process. In one embodiment, a library of standard manufacturing processes is created. The library comprises a plurality of master process objects. In response to generating a manufacturing project, a set of master process objects is selected from the plurality of master process objects in the library. The set of master process objects is associated with the manufacturing project to create a set of process usage objects within the manufacturing project. The set of master process objects in the library of standard manufacturing processes are linked to the manufacturing project without copying the set of master process objects into the manufacturing project. The set of usage process objects in the manufacturing project is populated with information specific to the manufacturing project.

Thus, the process defines the creation of usage process objects that are associated to master process objects that allow for the creation and management of a single source of all process data.

Figure 3:
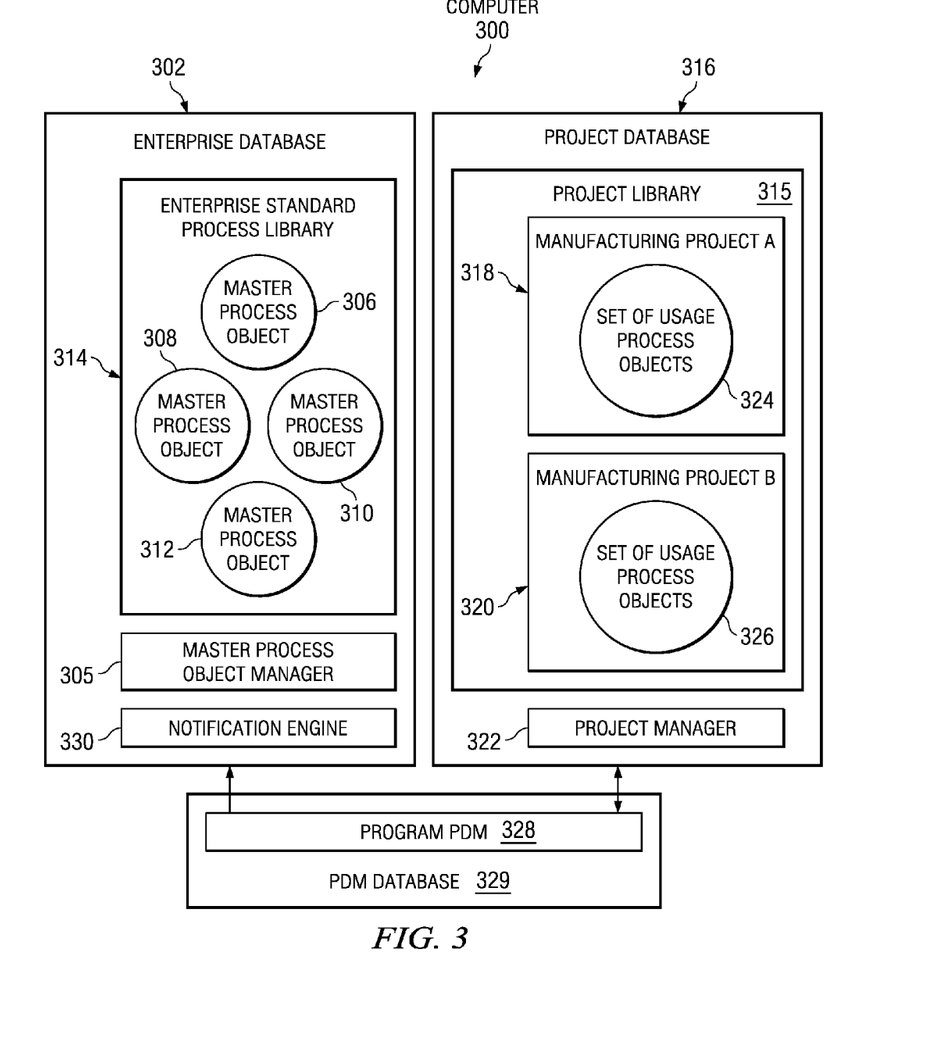
FIG. 3 is a block diagram of a manufacturing project management system in accordance with an advantageous embodiment.

FIG. 3 is an illustration of manufacturing projects utilizing master process objects in an enterprise standard process library in accordance with an advantageous embodiment. Computer 300 may be implemented using any type of computing device, such as a personal computer, laptop, personal digital assistant, or any other computing device depicted in FIGS. 1 and 2.

In this example, computer 300 includes enterprise database 302. Enterprise database 302 is any type of known or available database or database system for storing data. Enterprise database 302 may be implemented on a single data storage device, as well as two or more data storage devices in combination. A data storage device includes, without limitation, a hard disk, a read only memory (ROM), a non-volatile random access memory (NV-RAM), a flash memory, or any other type of data storage device.

Master process object manager 302 is software for creating, revising, updating, versioning, and managing master process objects, such as master process objects 306-312. A user utilizes master process object manager 302 to create new versions of master project objects 306-312.

A master process object is a reference process software object that defines fixed attributes of a process object in enterprise standard process library 314. A master process object contains all required fixed attributes as created and defined in enterprise library 314. This object type is created by master process object manager. Master process objects are maintained and stored in enterprise standard process library 314 in enterprise database 302.

In this example, only four master process objects are depicted in enterprise standard process library 314. However, any number of master project objects may be created using master process object manager 305 and stored in enterprise standard process library 314. Enterprise standard library 314 may include a single master process object or two or more master process objects. For example, enterprise standard library 314 may include ten master process objects, a hundred master process objects, or any other number of master process objects.

Master process objects 308-312 are manufacturing process objects. However, master process objects 308-312 are not limited to implementation as manufacturing process objects. Master process objects 308-312 may also include, without limitation, business process objects, inspection process objects, testing process objects, design process objects, or any other type of process objects. In this example, master process objects 308-312 are reference manufacturing process software objects.

Project library 315 is a library of the manufacturing process objects, parts, tooling and requirements used to create a project in project database 316. Project database 316 is a database for storing projects, such as manufacturing project A 318 and manufacturing project B 320. Project database 316 may be implemented as any type of database or database system, such as, without limitation, a relational database system. In this example, project database 316 stores two projects. However, project database 316 may include any number of projects. In addition, project library 315 may include any type of projects or process instances. In this example, manufacturing project A 318 is a product specific change controlled manufacturing project.

Project manager 322 is process planning software for creating projects, such as manufacturing project A 318 and manufacturing project B 320. A user and/or project manager 322 selects master process objects for a given project from enterprise standard process library 314. The selected master process objects are associated to the given project to create usage process objects.

A usage process object is a process object instance that links to a master process object, such as master process objects 308-312 in enterprise standard process library 314. A usage process object contains the part and resource associations to the process. The usage process object also has variable attributes that are populated from the relationship of the part instances and manufacturing specifications to define the required manufacturing processes. This linking of process instances in a project with a master process object in enterprise standard process library 314 allows a user to associate an instance of the manufacturing process where required in the process structure which is associated to a reference process, such as master process object 310.

In this example, a user and/or project manager 322 selects a set of master process objects for manufacturing project A 318 that includes master project object 310 to form set of usage process objects 324. A usage process object is an instance of a master process object that defines variable attributes.

The user and/or project manager 322 populates usage information on the process usage objects in set of usage process objects 324. Manufacturing project A 318 is saved in project database 316. Likewise, the user and/or project manager 322 associates master process objects 310 and 312 with manufacturing project B 320 to form set of usage process objects 326. The user and/or project manager 322 populates usage information on the one or more process objects in set of usage process objects 324.

Set of usage process objects 324 define variable attributes of the master process objects. The usage process objects in set of usage process objects 324 do not contain information that is in master process objects 308-312. The usage process objects in set of usage process objects 324 do not contain any copies of master process objects 308-312. Set of usage process objects only contain information that is specific to manufacturing project A 318 and information that is not found in master process objects 308-312.

The individual instances of a given master process object has the same basic behavior between manufacturing project instances and enterprise standard process library 314. Thus, only the unique information for each usage is stored in project library 315. The common information is stored in master process objects in enterprise standard process library 314 and is obtained by a project, such as project A 318, directly from the enterprise standard process library 314.

Program product data management (PDM) 328 is software for controlling data related to products. Program PDM 328 manages relations between data that defines products and stores those relationships in PDM database 329. The user and project manager 322 associates part definitions, product definitions, tool definitions, manufacturing requirements, and documents in PDM database 329 to set of usage process objects 324 and set of usage process objects 326.

Notification engine 330 is software for notifying a user, owner of a project, and/or project manager when a master process object linked to a given project is altered, modified, updated, or versioned. In other words, when a user or administrator revises and/or updates a master process object in enterprise standard process library 314 to an updated version, notification engine 330 sends a notification to a user, project owner, and/or project manager 322 notifying the user or project owner that a master process object linked to the project has been updated.

The process usage object associated with the revised or versioned master process object is revised or versioned. The project with the associated set of usage process objects, such as manufacturing project A 318 with set of usage process objects 324, is released and made available to a manufacturing factory with the latest released process master information included in usage information.

Figure 4:
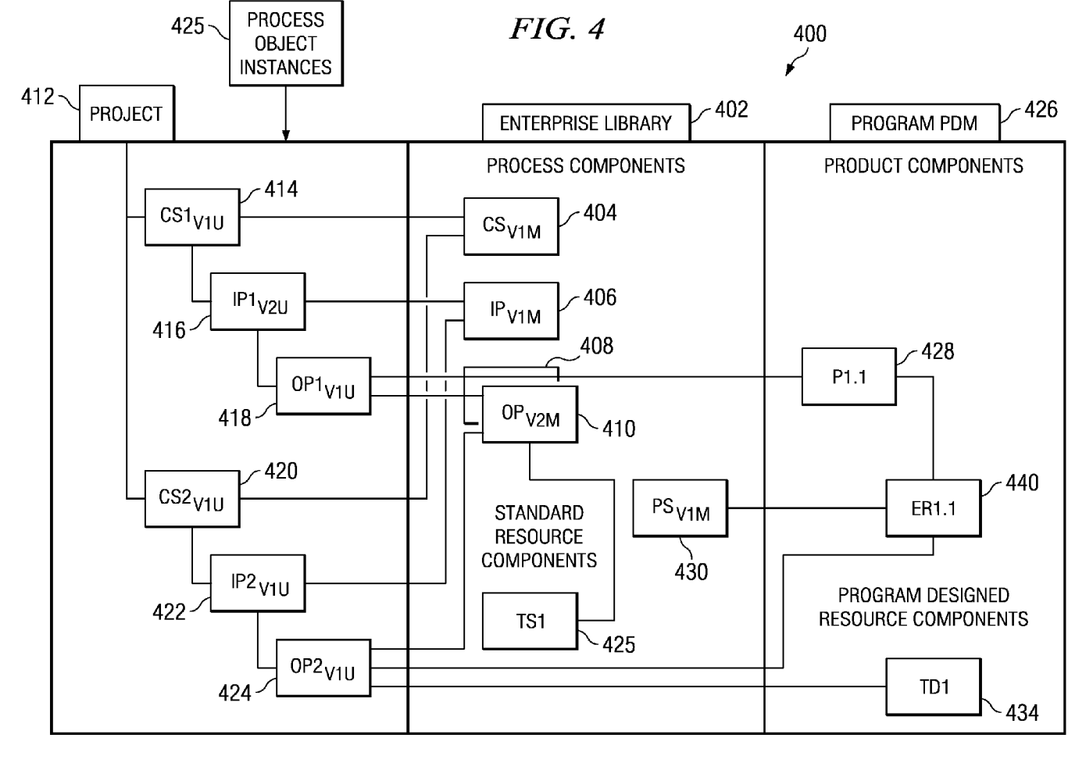
FIG. 4 is an illustration of objects in a manufacturing project management system in accordance with an advantageous embodiment.

Referring now to FIG. 4, an illustration of objects in a manufacturing project management system is depicted in accordance with an advantageous embodiment. Manufacturing project management system 400 is a system for creating, managing, and utilizing standard process and resource references and instances of manufacturing processes. Manufacturing project management system 400 may be implemented on a single computer, such as computer 300 in FIG. 3, or on a plurality of computing devices, such as a network data processing system, a grid computing system, or a server cluster.

Enterprise library 402 is a library of standard manufacturing processes that are usable for multiple projects in an enterprise, such as, without limitation, enterprise standard process library 314 in FIG. 3. Enterprise library 402 consists of a plurality of master standard process objects, such as master process objects 308-312 in FIG. 3.

The master process objects include the master definition of the manufacturing processes to be used by all programs associated with projects. These definitions may include, without limitation, higher level process objects down through the associated factory work instructions used to define the individual process steps used by factory personnel. The utilization of master process objects in enterprise library 402 allows individual manufacturing programs to access enterprise library 402 during the creation and maintenance of manufacturing process plans to be executed on the production shop floor.

In this example, the master process objects include, without limitation, a control station version 1 master ($CS_{V1M}$) 404, installation plan version 1 master ($IP_{V1M}$) 406, operation version 1 master ($OP_{V1M}$) 408, and operation version 2 master ($OP_{V2M}$) 410. Control station version 1 master 404, installation plan version 1 master 406, operation version 1 master 408, and operation version 1 master 410 are master control station software objects that are stored and managed in enterprise library 402.

Control station version 1 master 404 is a master control station software object. Installation plan version 1 master 406 is a master installation plan software object. Operation version 1 master 408 and operation version 2 master 410 are master operation software objects that are the lowest level of manufacturing process definition. Operation version 2 master 410 is an updated or revised version of operation version 1 master 408.

During manufacturing process planning, a link is created between a set of one or more master processes. The master processes are stored in enterprise library 402 and the usage process objects are stored with the manufacturing project.

Project 412 is a manufacturing project stored in a database. Project 412 is associated with a set of one or more usage process objects, such as set of usage process objects 324 in FIG. 3. In this example, the set of usage process objects includes control station version 1 usage ($CS1_{V1U}$) 414, installation plan version 1 usage ($IP_{V1U}$) 416 and operation version 1 usage ($OP_{V1U}$) 418 associated with a first project. Control station version 1 usage 414 is a collector of related installation plans. Control station version 1 usage 414 is a usage process object in project library 412 that is linked to control station version 2 master 404 in enterprise library 402. Control station version 1 usage 414 has precedence and sequence with other control station usage process objects.

Control station version 1 master 404 is selected from enterprise library 402 and associated to the process structure of project 412. Control station version 1 usage 414 is an instance of the control station reference, control station version 1 master 404, in the process view associated with project 412. Control station version 1 usage 414 is an instance of control station version 1 master 404 that only contains information specific to project 412. Control station version 1 usage 414 does not contain information that is included in control station version 1 master 404. Control station version 1 usage 414 is not a copy of the master process object, control station version 1 master 404.

Installation plan version 1 usage 416 is a collector of related operations that is linked to installation plan version 1 master 406 in enterprise library 402. Installation plan version 1 usage 414 has precedence and sequence with other installation plan usage process objects.

Operation version 1 usage 418 is the lowest level of the process structure. Operation version 1 usage 418 defines the lowest level of process to be performed in the factory. Operation version 1 usage 418 is sequenced only with other operation usage process objects.

In this example, the set of usage process objects associated with project 412 also includes control station version 1 usage ($CS2_{V1U}$) 420, installation plan version 1 usage ($IP2_{V1U}$) 422, and operation version 1 usage ($OP2_{V1U}$) 424.

The usage process objects, such as, without limitation, control station version 1 usage 420, installation plan version 1 usage 422, and operation version 1 usage 424 shows a user all the data held in the master process objects corresponding to the usage process objects. The usage process objects allow the user to add specific usage information, such as, but not limited to, process to process relations, process to part relations, tooling to process relationships, manufacturing effectivity and other usage information to the process without altering the master process objects or creating a copy of data and/or fields in the master process objects.

When data is updated in enterprise library 402, all usages of this information will have this updated information available. No update or plan modification is required by personnel maintaining process data on individual manufacturing projects. However, data that is added to the usage information is not reflected in the master data which allows all programs to use the same master data without making a copy of this data.

In other words, usage process object instances 425 in a process view for project 412 originate from the latest approved version of a master object in enterprise library 402. When a master process object is revised or versioned, the usage process object instances 425 of the master process object in the project are updated or versioned. For example, when operation version 1 master 408 is versioned to operation version 2 master 410, operation version 1 usage 418 and operation version 1 usage 424 are also updated or versioned. In this example, the master process object and the instance of the usage process objects are versioned separately, rather than simultaneously.

Enterprise library 402 contains the latest approved version of each master process object. The usage process object instances used in the process view associated with project 412 originate from the latest approved version of the master process objects in enterprise library 402. For example, enterprise library 402 contains operation version 2 master 410 which is a revision or updated version of operation version 1 master 408. In this example, operation version 1 master 408 is updated or versioned to form operation version 2 master 410.

In addition, the contents of the master process objects are linked to project 412 and the contents are not copied into project 412 in the project library. This versioning and linking of master process objects in enterprise library 402 to usage process objects associated with project instances in project library 412, rather than copying the content of standard processes directly into project instances, minimizes the impact of revisions or versioning of standard process objects on project 412 and users associated with project 412.

The individual instances of a given master process object has the same basic behavior between project 412 and enterprise library 402. For example, control station version 1 usage 414 and control station version 1 usage 420 are two individual instances of the master process object control station version 1 master 404. Both control station version 1 usage 414 and control station version 1 usage 420 have the same basic behavior.

Figure 5:
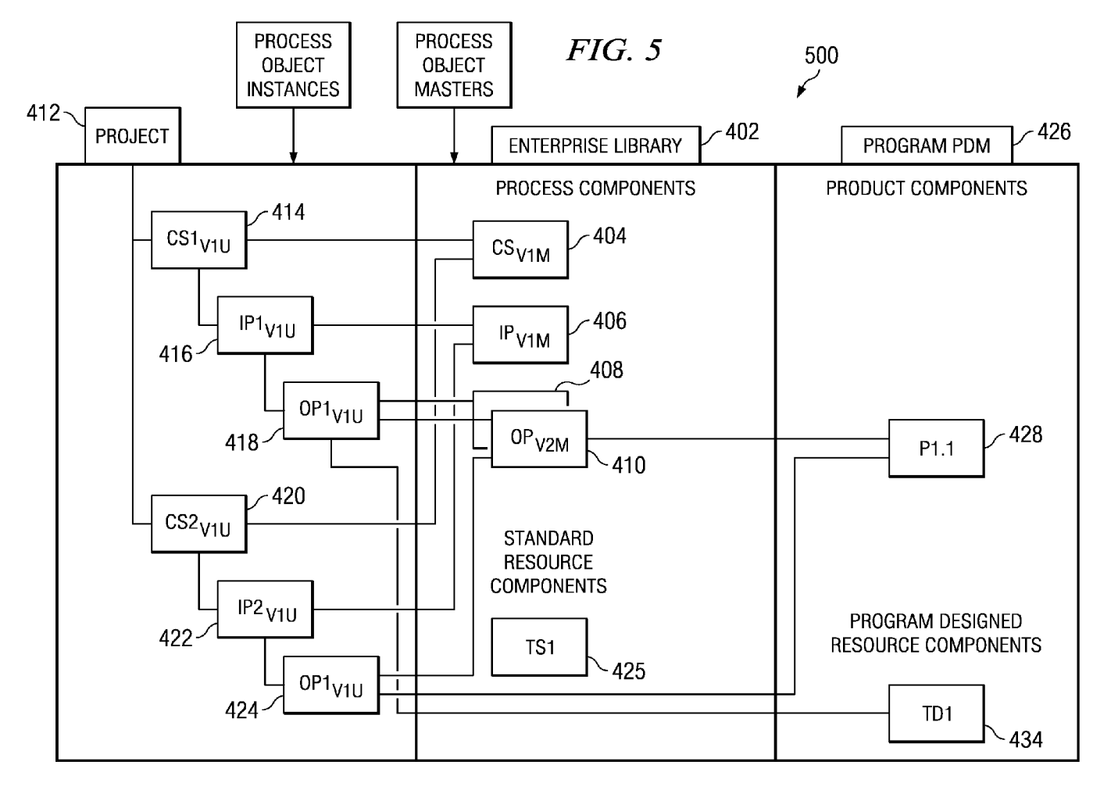
FIG. 5 is an illustration of part and tool relationships linked to master process objects in accordance with an advantageous embodiment.

FIG. 5 is an illustration of part and tool relationships linked to master process objects in accordance with an advantageous embodiment. Manufacturing project management system 500 is a project management system showing part and tool relationships. In this example, part and tool definitions are stored in a product data management (PDM) database, such as PDM database 329 in FIG. 3. Program product data management (Program PDM) 426 is software for managing part and tool information, such as program PDM 328 in FIG. 3.

Part and tool relationships made from program PDM 426 to usage process objects in the process view of project 412 do not modify the master process objects in enterprise library 402. In other words, when product components objects, such as part 1, usage 1 428 is incorporated into operation version 1 usage 424, operation version 2 master 410, which is the master process object linked to operation version 1 usage 424, is not modified or altered.

Part and tool relationships made to a master process object in enterprise library 402 automatically updates the corresponding usage process object instances attribute data in project 412. The usage process object instances are updated from the latest released version of the master process objects to show the current part and tool associations. However, the usage process object version is not kept in sync with the master process object in enterprise library 402. Thus, information from the PDM database regarding product components and program designed resource components are added or copied into the usage process object instance and/or utilized to modify the usage process object instance in project 414. However, the master process objects in enterprise library 402 are not altered, modified, or updated with the product component information, tool definitions, part definitions, part and tool relationships, or other product data management information.

However, part and tool relationships made to a master process object in enterprise library 402 updates the usage process objects in the process view of project 412 with the latest released version of the fields and information in the master process objects. For example, updates to operation version 2 master 410 with part and tool relationships automatically updates operation version 1 usage 418 and operation version 1 usage 424 in project 412. Thus, updates made to master process object attributes in enterprise library 402 are automatically propagated to all usage process objects corresponding to the updated master process objects in the process view of project 412.

Finally, engineering requirements (ER1.1) 440 are manufacturing requirements for one or more part instances. Manufacturing process specifications are associated to engineering requirements 440 as part of the definition of a part instance for project 412. The part instance is associated as a first use once in the project. Subsequent processes to be performed on the part instance are defined by engineering requirements 440 with the individual process defined as a filtered view of the manufacturing process specification.

Figure 6:
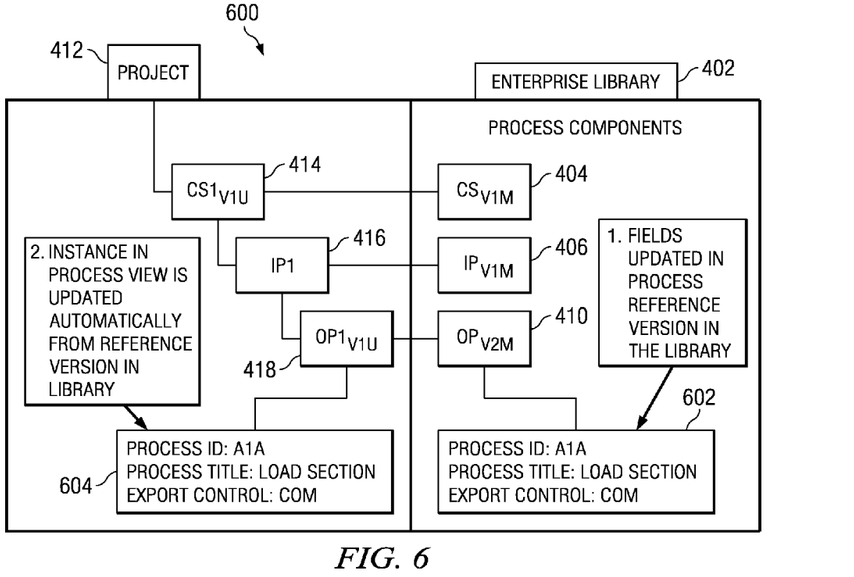
FIG. 6 is an illustration of updating a master process object in accordance with an advantageous embodiment.

Turning now to FIG. 6, an illustration of updating a master process object is shown in accordance with an advantageous embodiment. Manufacturing project management system 600 is a project management system in which a master process object is changed, updated, modified, versioned, or otherwise altered. In this example, fields in operation version 2 master 410 are updated in enterprise library to include information in field 602, such as, without limitation, process identifier (ID), process title, and export control information fields. The update of fields in operation version 2 master 410 is only shown as an example and not as a limitation on the embodiments. An update to a master process object may include different changes to a master process object and/or fields associated with the master process object.

When updates are made to the fixed attributes in the master process object and operation version 2 master 410, the updates are automatically made to the usage process object, operation version 1 usage 418. Thus, in this example, fields 602 including process identifier, process title, and export control are added to operation version 1 usage 418 as fields 604. In other words, the process object instance in the process view of project 412 is updated automatically from the master process object in enterprise library 402 without user intervention and without copying fixed attribute data from the master process object into the process object instance in project 412.

Figure 7:
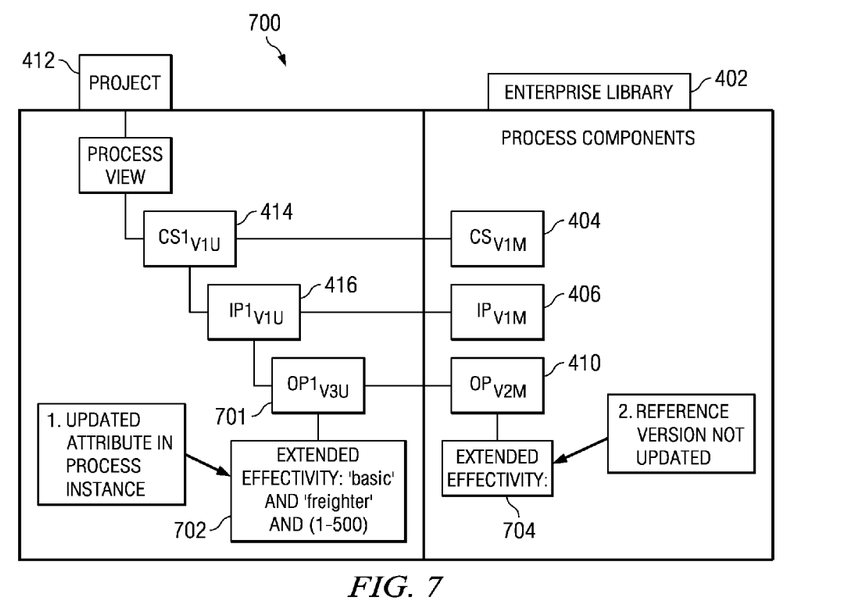
FIG. 7 is an illustration of updating process usage object in accordance with an advantageous embodiment.

FIG. 7 is an illustration of updating process usage object in accordance with an advantageous embodiment. Manufacturing project management system 700 is a project management system in which inputs are made to usage process objects in project 412. A user and/or process add input data to a process object instance in project 412, such as operation version 3 usage 701. In this example, the inputs add the data 'basic' & 'freighter' & (1-500) to extended affectivity field 702. However, the reference version, operation version 2 master 410 is not updated. Thus, field 704 does not include the project specific inputs made to usage process objects in project 412.

Figure 8:
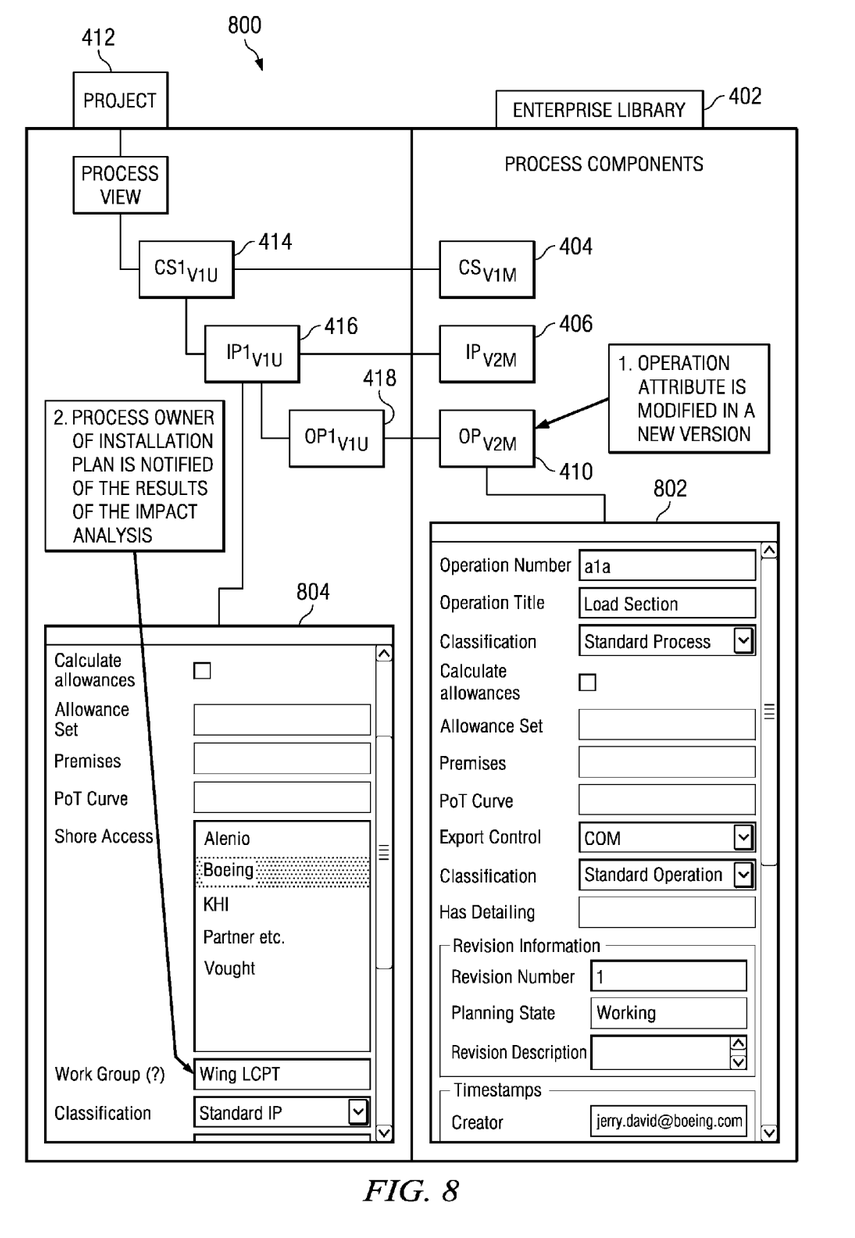
FIG. 8 is an illustration of a notification sent to a user associated with a project when a master process object linked to the project is updated in accordance with an advantageous embodiment.

Referring now to FIG. 8, an illustration of a notification sent to a user associated with a project when a master process object linked to the project is updated is shown in accordance with an advantageous embodiment. Manufacturing project management system 800 is a project management system, such as project management system 400 in FIG. 4.

When a master process object in enterprise library 402 is modified to form new process version 802, an impact analysis is performed by the master process object manager software. The owner of the usage process object corresponding to the master process object in project 412 is notified that new process version 802 of the master process object is available by a notification engine, such as notification engine 330 in FIG. 3.

The impact analysis is a list of where the process instances are associated. A process owner receives a single impact analysis for each library process object version change made to each master process object. The user goes to project 412 to validate process impacts and make planning changes in project 412 as required to assure the ability of the product to produce.

In this example, an operation attribute is modified in operation version 2 master 410, which is a master process object in enterprise library 402. In response, an impact analysis is performed. The results of the impact analysis are sent as notification 804 to the process owner.

Thus, as shown in FIG. 3-8, the advantageous embodiments may be used with a combination of non-three dimensional (3D) data such as part and process attributes, process software objects, part to process relationships, tooling to process relationships, process object to process object relationships. The embodiments may also be used with 3D product and tooling definition and their associated relation types.

Figure 9:
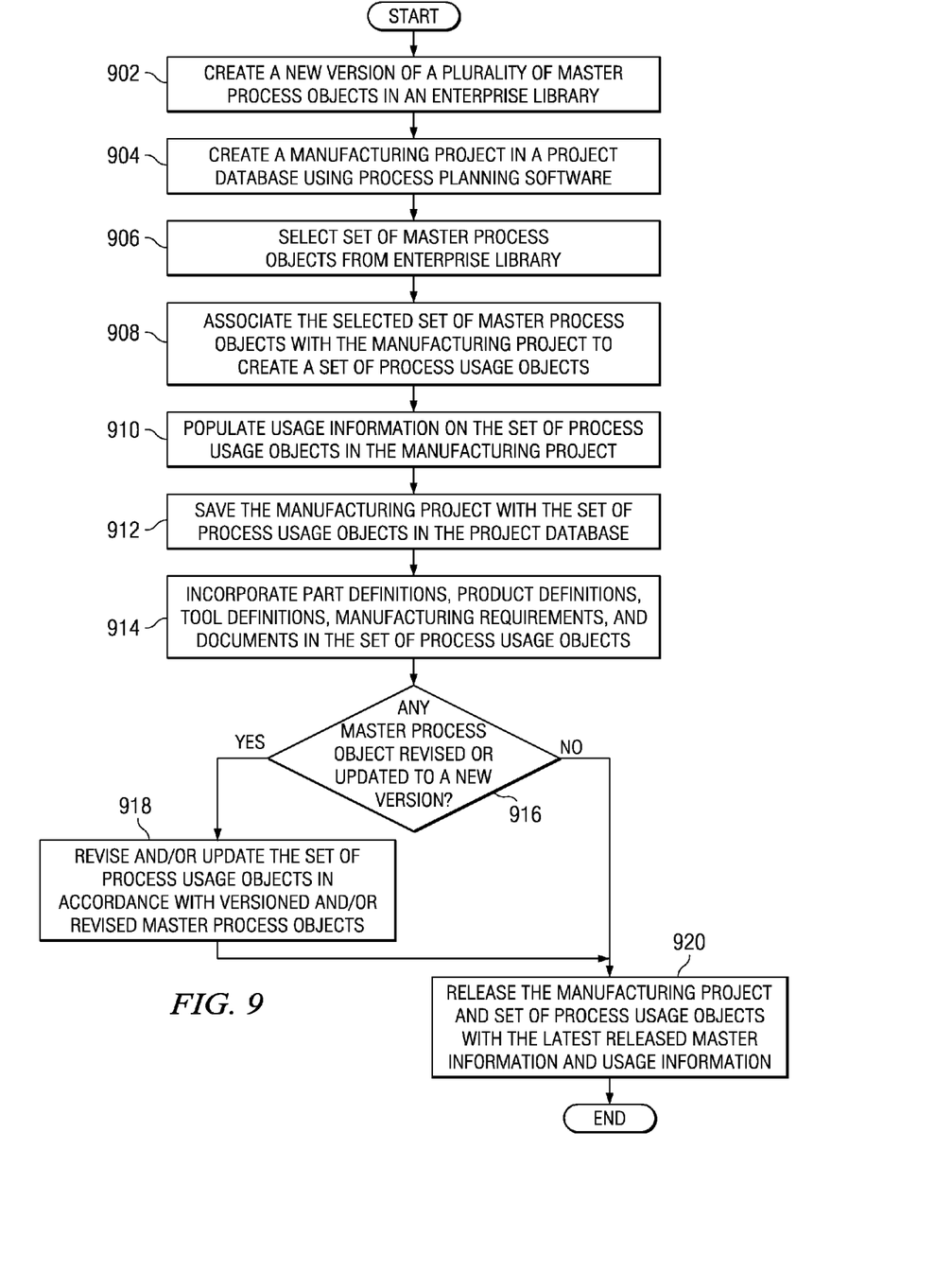
FIG. 9 is a flowchart of a process for project planning in a manufacturing process using a library of master process objects in accordance with an advantageous embodiment.

FIG. 9 is a flowchart of a process for project planning in a manufacturing process using a library of master process objects in accordance with an advantageous embodiment. Operations 902 are implemented by software for managing an enterprise database system, such as master process object manager 302 in FIG. 3. Operations 904-920 are implemented by software for managing usage information in manufacturing project instances, such as project manager 314 in FIG. 3.

The process begins by creating a new version of a plurality of master process objects in an enterprise library (operation 902). A manufacturing project is created in a project database using process planning software (operation 904). In this example, the manufacturing process is a product specific change controlled manufacturing project.

A set of master process objects are selected from the plurality of master process objects in the enterprise library (operation 906). The set of master process objects is a set of one or more master process objects. The selected set of master objects is associated to the manufacturing project to create a set of process usage objects for the manufacturing project (operation 908).

Usage information is populated on the set of process usage objects in the manufacturing project (operation 910). The manufacturing project with the set of process usage objects is saved in the project database (operation 912). Part definitions, product definitions, tool definitions, manufacturing requirements, and documents are incorporated in the set of process usage objects for the manufacturing project (operation 914).

A determination is made as to whether any master process object in the set of master process objects in the enterprise library that is associated with the manufacturing project is revised and/or updated as a new version of the master process object by the process owner (operation 916). If any of the master process objects are revised and/or updated as a new version, the set of process usage objects are versioned and/or revised in accordance with the versioned and/or revised master process objects (operation 918).

If any of the master process objects linked with the manufacturing project is not revised or updated as a new version at step 916 or after versioning and/or revising the process usage objects in operation 918, the manufacturing project and associated set of process usage objects with the latest released process master information and usage information in the set of process usage objects is released and made available to the manufacturing factory (operation 920).

Thus, this illustrative embodiment defines how to modify current copy based standard manufacturing process libraries to use master process objects and usage process objects in manufacturing process planning. Usage process objects are linked with master process objects to allow for an efficient manner to create, manage and use standard manufacturing processes.

The advantageous embodiments provide a computer implemented method, apparatus, and computer program product for planning in a manufacturing process. In one embodiment, a library of standard manufacturing processes is created. The library comprises a plurality of master process objects. In response to generating a manufacturing project, a set of master process objects is selected from the plurality of master process objects in the library. The set of master process objects is associated with the manufacturing project to create a set of process usage objects within the manufacturing project. The set of master process objects in the library of standard manufacturing processes are linked to the manufacturing project without copying the set of master process objects into the manufacturing project. The set of usage process objects in the manufacturing project is populated with information specific to the manufacturing project.

In this embodiment, usage process objects associated with a process instance are linked to master process objects to minimize the quantity of data that is stored and managed at the master process and the usage of the process. Only usage specific data, such as part to process relations, requirements, and requirement relations are stored with the usage objects in the process instance. All common information for a manufacturing process is stored with the reference object in the enterprise standard process library.

There is a single authority for each usage of a standard process due to utilization of a single master process object for each process stored and managed in an enterprise library, along with only specific usage data stored with each usage process in project instances in a project library. Modifications to the reference object are propagated to all usage process objects without user intervention and without copying of reference object data to every process instance. Thus, the utilization of reference process objects and usage process objects minimizes the duplication of manufacturing process data to be stored while creating manufacturing process plans and simplifies updating and versioning each usage process in project instances when master process objects are updated and/or versioned.

The process also results in cost savings by utilizing usage software objects linked to master process libraries to reduce the quantity of data saved, the quantity of backed up data, and the amount of configuration changes managed. The process may result in cost avoidance on the quantity of data to be stored, backed up and managed over time.

This process may also result in greater centralization and organization of standard processes for an enterprise. These standardized master process objects may be used by any program in a network data processing system. In addition, when the enterprise library is updated with mandatory changes, these revisions are propagated to all usages, which assure consistent manufacturing processes are used throughout the enterprise. In addition, when changes are made to a master process object, the programs do not need to change existing process plans due to the automated updates to the processes. The process enables manufacturing processes to be controlled at an enterprise level rather than individual program level. Also, less manual manufacturing plan updates are required due to the latest released master process version is always in the process plans.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer-usable or computer-readable medium providing program code for use by or in connection with a computer or any device or system that executes instructions. For the purposes of this disclosure, a computer-usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer-readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer-usable or computer-readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer implemented method for planning in a manufacturing process, the computer implemented method comprising:

a computer creating a library of standard manufacturing processes, wherein the library comprises a plurality of master process objects;

the computer, responsive to generating a manufacturing project, selecting a set of master process objects from the plurality of master process objects in the library;

the computer, associating the set of master process objects with the manufacturing project to create a set of process usage objects within the manufacturing project, wherein the set of master process objects in the library of standard manufacturing processes are linked to the manufacturing project without copying the set of master process objects into the manufacturing project; and the computer, populating the set of usage process objects in the manufacturing project with information specific to the manufacturing project; and the computer, configuring a project manager to generate manufacturing projects, wherein a set of master process objects are selected from the plurality of master process objects and wherein the project manager associates the set of master process objects with a manufacturing project to create a set of process usage objects within the manufacturing project, wherein the set of master process objects in the library of standard manufacturing processes are linked to the manufacturing project without copying the set of master process objects into the manufacturing project, wherein the project manager populates the set of usage process objects in the manufacturing project with information specific to the manufacturing project, and wherein the set of usage process objects contain only the information specific to the manufacturing project.

2. The computer implemented method of claim 1 wherein associating the set of master process objects with the manufacturing project further comprises:

the computer, linking the set of master process objects with the manufacturing project, wherein the set of process usage objects access information in the set of master process objects in the library of standard manufacturing processes without copying the information in the set of master process objects into the manufacturing project.

3. The computer implemented method of claim 1 wherein the set of master process objects contain only standard, fixed variable information for utilization by a plurality of projects.

4. The computer implemented method of claim 1 wherein each master process object in the set of master process objects has fixed attributes associated with the manufacturing project that are defined in the library of standard manufacturing processes.

5. The computer implemented method of claim 1 wherein variable attributes associated with the manufacturing project are defined only in the set of usage process objects within the manufacturing project.

6. The computer implemented method of claim 1 further comprising:
   the computer modifying a master process object in the set of master process objects to form a modified master process object; and
   the computer updating usage process objects in the set of usage process objects corresponding to the modified master process object, wherein updating the usage process objects only updates fixed attributes without modifying variable attributes unique to the manufacturing project.

7. The computer implemented method of claim 1 further comprising:
   responsive to updating a master process object associated with the manufacturing project, sending a notification of an update to a user associated with the manufacturing project.

8. A computer program product for planning in a manufacturing process, the computer program product comprising:
   a non-transitory computer readable medium;
   program code stored on the computer readable medium for creating a library of standard manufacturing processes, wherein the library comprises a plurality of master process objects;
   program code stored on the computer readable medium for selecting a set of master process objects from the plurality of master process objects in the library in response to generating a manufacturing project;
   program code stored on the computer readable medium for associating the set of master process objects with the manufacturing project to create a set of process usage objects within the manufacturing project, wherein the set of master process objects in the library of standard manufacturing processes are linked to the manufacturing project without copying the set of master process objects into the manufacturing project;
   program code stored on the computer readable medium for populating the set of usage process objects in the manufacturing project with information specific to the manufacturing project; and
   program code stored on the computer readable medium for configuring a project manager to generate manufacturing projects, wherein a set of master process objects are selected from the plurality of master process objects and wherein the project manager associates the set of master process objects with a manufacturing project to create a set of process usage objects within the manufacturing project, wherein the set of master process objects in the library of standard manufacturing processes are linked to the manufacturing project without copying the set of master process objects into the manufacturing project, wherein the project manager populates the set of usage process objects in the manufacturing project with information specific to the manufacturing project, and wherein the set of usage process objects contain only the information specific to the manufacturing project.

9. The computer program product of claim 8 further comprising:
   program code stored on the non-transitory computer readable medium for linking the set of master process objects with the manufacturing project, wherein the set of process usage objects access information in the set of master process objects in the library of standard manufacturing processes without copying the information in the set of master process objects into the manufacturing project.

10. The computer program product of claim 8 wherein the set of master process objects contain only standard, fixed, variable information for utilization by a plurality of projects.

11. The computer program product of claim 8 wherein each master process object in the set of master process objects has fixed attributes associated with the manufacturing project that are defined in the library of standard manufacturing processes.

12. The computer program product of claim 8 wherein variable attributes associated with the manufacturing project are defined only in the set of usage process objects within the manufacturing project.

13. The computer program product of claim 8 further comprising:
   program code stored on the non-transitory computer readable medium for modifying a master process object in the set of master process objects to form a modified master process object; and
   program code stored on the non-transitory computer readable medium for updating usage process objects in the set of usage process objects corresponding to the modified master process object, wherein updating the usage process objects only updates fixed attributes without modifying variable attributes unique to the manufacturing project.

14. The computer program product of claim 8 further comprising:
   program code stored on the non-transitory computer readable medium for sending a notification of an update to a user associated with the manufacturing project in response to updating a master process object associated with the manufacturing project.

15. An apparatus for production planning in a manufacturing process comprising:
   one or more processors, one or more computer readable memories, and one or more computer readable tangible storage devices;
   program instructions stored on the one or more computer readable tangible storage devices for execution by the one or more processors via the one or more computer readable memories for configuring a first database as a library of standard manufacturing processes, wherein the first database comprises a plurality of master process objects, wherein each master process object in the plurality of master process objects defines fixed attributes of processes; and
   program instructions stored on the one or more computer readable tangible storage devices for execution by the one or more processors via the one or more computer readable memories for configuring a second database as a collection of manufacturing projects, wherein each manufacturing project comprises a set of usage process objects, wherein each usage process object corresponds to a master process object in the first database, and wherein variable attributes associated with the manufacturing project are defined only in the set of usage process objects within the each manufacturing project; and program instructions stored on the one or more computer readable tangible storage devices for execution by the one or more processors via the one or more computer readable memories for configuring a project manager to generate manufacturing projects, wherein a set of master process objects are selected from the plurality of master process objects and wherein the project manager associates the set of master process objects with a manufacturing project to create a set of process usage objects within the manufacturing project, wherein the set of master process objects in the library of standard manufacturing processes are linked to the manufacturing project without copying the set of master process objects into the manufacturing project, wherein the project manager populates the set of usage process objects in the manufacturing project with information specific to the manufacturing project, and wherein the set of usage process objects contain only the information specific to the manufacturing project.

16. The apparatus of claim 15 further comprising:

program instructions stored on the one or more computer readable tangible storage devices for execution by the one or more processors via the one or more computer readable memories for configuring a master process object manager to create the library of standard manufacturing processes in the first database, wherein the set of master process objects in the library contain only standard, fixed variable information for utilization by the collection of manufacturing projects.

17. The apparatus of claim 15 further comprising:

program instructions stored on the one or more computer readable tangible storage devices for execution by the one or more processors via the one or more computer readable memories for configuring a notification engine to send a notification of an update to a user associated with a given manufacturing project in response to detecting the update of a master process object associated with the manufacturing project.

* * * * *